(12) United States Patent
Kuo et al.

(10) Patent No.: US 11,310,993 B2
(45) Date of Patent: Apr. 26, 2022

(54) MASTER-SLAVE COOPERATIVE CLEANING ROBOT SYSTEM

(71) Applicant: National Taiwan University of Science and Technology, Taipei (TW)

(72) Inventors: Chung-Hsien Kuo, Taipei (TW); Yu-Cheng Kuo, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 232 days.

(21) Appl. No.: 16/726,480

(22) Filed: Dec. 24, 2019

(65) Prior Publication Data

US 2020/0205371 A1 Jul. 2, 2020

Related U.S. Application Data

(60) Provisional application No. 62/784,647, filed on Dec. 24, 2018.

(51) Int. Cl.
*A01K 1/01* (2006.01)
*A47L 9/00* (2006.01)
(Continued)

(52) U.S. Cl.
CPC ............... *A01K 1/01* (2013.01); *A47L 9/009* (2013.01); *A47L 9/246* (2013.01); *A47L 9/2826* (2013.01);
(Continued)

(58) Field of Classification Search
CPC ... A01K 1/01; A47L 11/4044; A47L 2201/04; A47L 2201/06; A47L 9/009; A47L 9/246;
(Continued)

(56) References Cited

U.S. PATENT DOCUMENTS 5,199,996 A * 4/1993 Jonas .................. A47L 9/24
134/18
2003/0182758 A1* 10/2003 Hisano .................. A47L 9/00
15/412

(Continued)

FOREIGN PATENT DOCUMENTS

WO WO-02074150 A1 * 9/2002 ............. A47L 9/009

*Primary Examiner* — Marc Carlson
(74) *Attorney, Agent, or Firm* — Muncy, Geissler, Olds & Lowe, P.C.

(57) ABSTRACT

The present invention provides an autonomous cleaning robot device for cleaning in the animal husbandry environment. The cleaning robot is composed of a master machine (autonomous moving controller) and a slave machine (self-propelled cleaning head). The master machine and the slave machine are connected by a robotic arm and a traction hose. The robotic arm can adapt to the movement of the cleaning slave machine to reduce the resistance and secondary pollution or damage caused by friction between the traction cable and the ground during the movement. The traction hose combined with the robotic arm allows slave machine to enter and exit the fence without opening and closing the door to improve efficiency. In the treatment of dirt, the excrement is collected by a suction driving device, and is centrally collected in a storage tank, and then is compacted into blocks by the excrement compression device.

10 Claims, 4 Drawing Sheets

(51) Int. Cl.
  *A47L 9/24*  (2006.01)
  *A47L 9/28*  (2006.01)
(52) U.S. Cl.
  CPC ........... *A47L 9/2842* (2013.01); *A47L 9/2884* (2013.01); *A47L 2201/04* (2013.01); *A47L 2201/06* (2013.01)
(58) Field of Classification Search
  CPC .... A47L 9/2826; A47L 9/2842; A47L 9/2852; A47L 9/2884
  See application file for complete search history.

(56) References Cited

U.S. PATENT DOCUMENTS

| | | | |
|---|---|---|---|
| 2005/0055792 A1* | 3/2005 | Kisela | A47L 9/0411 15/319 |
| 2005/0278888 A1* | 12/2005 | Reindle | A47L 9/2805 15/319 |
| 2006/0085095 A1* | 4/2006 | Reindle | A47L 9/2847 700/258 |
| 2007/0061040 A1* | 3/2007 | Augenbraun | A47L 5/225 700/245 |
| 2009/0133720 A1* | 5/2009 | Van Den Bogert | G05D 1/0274 134/18 |
| 2018/0008109 A1* | 1/2018 | Sauer | A47L 5/362 |
| 2018/0020894 A1* | 1/2018 | Sauer | A47L 9/2868 15/319 |
| 2019/0039236 A1* | 2/2019 | Miller | A47L 9/2852 |

* cited by examiner

MASTER-SLAVE COOPERATIVE CLEANING ROBOT SYSTEM

CROSS-REFERENCE TO RELATED APPLICATIONS

This Non-provisional application claims priority under 35U.S.C. § 119(a) on Patent Application No(s). [62/784,647] filed in American United States Dec. 24 2018, the entire contents of which are hereby incorporated by reference.

FIELD OF THE INVENTION

The present invention relates to an improved cleaning robot, and more particularly to the improvement of cleaning robot for animal husbandry.

BACKGROUND OF INVENTION

There are five kinds of pigpen in Taiwan, including conventional back-end immersion, conventional plane washout, closed high bed, open high bed and stable manure. In traditional pig-keeping, the pigpen is washed with a lot of clear water, the groundwater is pumped up, and a lot of wastewater, odor and sludge are derived to pollute the environment. Without proper disposal, the waste and wastewater from the hog industry are likely to induce pollution. The wastewater includes excrement, washing water, litter and residual feed, if they are discharged to ditches without treatment, they will influence the environmental sanitation and make rivers and ditches turbid, black and stinking.

The management of wastewater in the livestock barn aims to reduce the water consumption of pigpen, and to clean the livestock barn, the total amount of wastewater to be treated can be reduced, cleaning the barn can reduce the formation of NH3, so as to reduce the incidence of pig pneumonia. There are two kinds of automatic cleaning facility at present. The first kind is the cleaning machine on cement floor, the second one is the washing facility under slotted floor.

1. Ground high-pressure washing manipulator, this mechanical facility uses a booster motor to supply water, and uses the manipulator to guide the water pipe to wash the floor everywhere in the pigpen. It is effective on washing operation, but the water consumption is relatively high. The pigpen with pigs inside cannot be washed with the treated wastewater, because there may be sanitation problems if the treated wastewater contacts pigs directly, and the treated wastewater may block up the nozzle. For this kind of washing facility, if wanted to the one pigpen is provided with only one set of washing gun, a two-row or a multi-row pigpen must be changed to a single-row pigpen, otherwise each row shall be equipped with a set of washing facility.

2. Automatic instantaneous washing system, under the slotted floor, used this system the treated pig manure wastewater can be pumped back to the water tank, and the floor under the slotted floor is washed by simple control equipment and washing system, and the wastewater can be recycled.

To sum up, there is not yet an effective pig manure wastewater pumpback system, so it is urgent to develop a pig manure wastewater recovery system for livestock barns, especially a system combined with the environmental characteristics of live farming which can clean livestock barns, reduce the wastewater to be treated and recover and clean the pig manure wastewater automatically, so as to solve the problems of universally aged stock raising population in Taiwan and decreasing manpower on the front line of farming industry.

SUMMARY OF THE INVENTION

In view of this, the present invention provides an autonomous cleaning robot device, which comprises a master machine(autonomous moving controller), a slave machine (self-propelled cleaning head), a traction hose and a robot arm; wherein the master comprises a multiwheel moving table; a dirt container; a vacuum source; a controller processor, it provides control function. The slave comprises a suction inlet connected to dirt receiver fluid; multiple-alignment tab; an autonomous moving table, which is connected to the controller processor for navigated cleaning control. The mastermachine and slavemachine are connected by the traction hose, providing the inflow path from the suction inlet to the dirt container and the paths for power source supply and communication cable. The length of this hose can be controlled by the mechanical arm to coordinate with the robot arm. The robot arm is combined with an end camera for slave positioning and calculating the hose distance.

Preferably, the mechanical arm comprises a plurality of connecting rods.

A preferred embodiment of the present invention, the mechanical arm has two operation modes, a single cleaning slave machine moves autonomously or the cleaning slave machine and mechanical arm work cooperatively, following the travel direction of cleaning slave to reduce the resistance resulted from the friction between the traction hose and the bottom surface when the slave is moving, and to solve the secondary pollution and damage resulted from the contact between the conventional traction hose and the bottom surface in the course of moving.

A preferred embodiment of the present invention, the mechanical arm can raise the self-propelled cleaning head according to the instruction of the controller processor to place it across region, it is unnecessary to open or close the door to enter or leave different regions.

A preferred embodiment of the present invention, there is a camera at the end of the mechanical arm, which identifies the slave machine positioning tab for spatialization positioning for identifies the hose image label for calculating the hose length.

A preferred embodiment of the present invention, the self-propelled cleaning head moves autonomously is through continuous tracks.

A preferred embodiment of the present invention, the autonomous moving controller has a briquetting device, which compresses the feces into blocks.

A preferred embodiment of the present invention, the self-propelled cleaning head has multiple-alignment tab.

A preferred embodiment of the present invention, the traction hose has multiple image recognition label point.

A preferred embodiment of the present invention, the controller processor uses the camera fixed to the end of the mechanical arm to capture the image recognition label point fixed to the traction hose and the positioning label of the self-propelled cleaning head for image recognition and calculating the hose scalable distance, the master as origin is combined with mechanical arm kinematics to calculate the spatially relative positions of the self-propelled cleaning head and the autonomous moving controller.

In order to attain the aforesaid and other purposes, one or more specific embodiments of the present invention are described below. The other features or advantages of the present invention are elaborated in embodiments and claims.

DETAILED DESCRIPTION OF THE INVENTION

Figure 1:
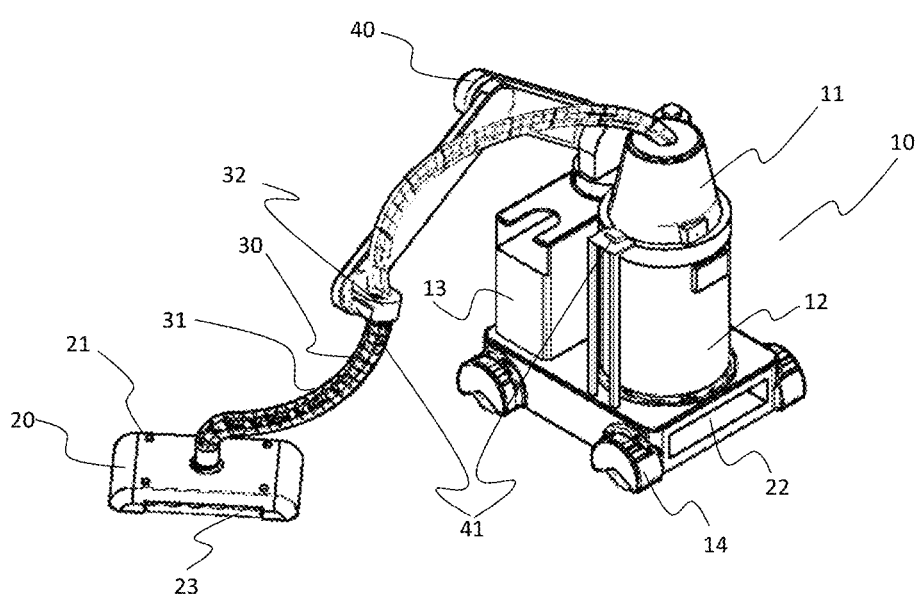
FIG. 1 is the schematic diagram of cleaning robot.

The present invention develops a cleaning robot device for livestock industry, which comprises an autonomous moving controller (10) and a self-propelled cleaning head (20), which are connected by a traction hose (30), the traction hose sucks the water or dirt through a suction inlet (23) of the self-propelled cleaning head into the dirt container (12) through this inflow route.

The developed autonomous cleaning robot device comprises an autonomous moving controller (10), which contains a vacuum source (11), a dirt container (12) connected to the vacuum source fluid, and a controller processor (13), which provides control function. In addition, there is a self-propelled cleaning head (20), which is connected to the controller processor, and the cleaning head has a suction inlet (23) connected to the dirt container (12) fluid; the self-propelled cleaning head (20) is connected to the controller processor (13) of the autonomous moving controller (10) by a traction hose (30), providing the inflow route from the suction inlet (23) to the dirt container (12); a mechanical arm (40), one end is connected to the autonomous moving controller (10), the other end is connected to the traction hose (30), the mechanical arm (40) can control the self-propelled cleaning head (20), following the travel direction of self-propelled cleaning head (20), and the self-propelled cleaning head (20) can be lifted to move in/out of the fence without opening the fence. The mechanical arm (40) can prevent the resistance resulted from the friction between the traction hose and bottom surface, and solve the secondary pollution and damage resulted from the contact between the conventional traction hose and the bottom surface in the course of moving. A power source supply is provided for the autonomous moving controller (10) and the self-propelled cleaning head (20). When the traction hose (30) connects the self-propelled cleaning head (20) to the controller processor (13), the controller processor (13) controls the self-propelled cleaning head (20) to move to the specified position using the mechanical arm (40).

The present invention provides image label point outside the traction hose, and uses traction mechanism to control the hose scalable length to coordinate with the robot arm length.

Figure 3A:
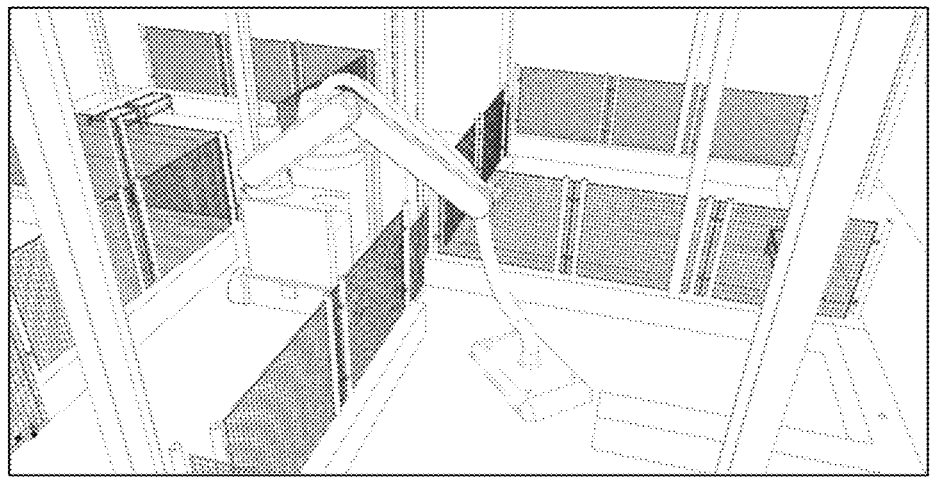
FIG. 3A-3C is the schematic diagram of the cleaning robot acting on the pigpen.
Figure 3B:
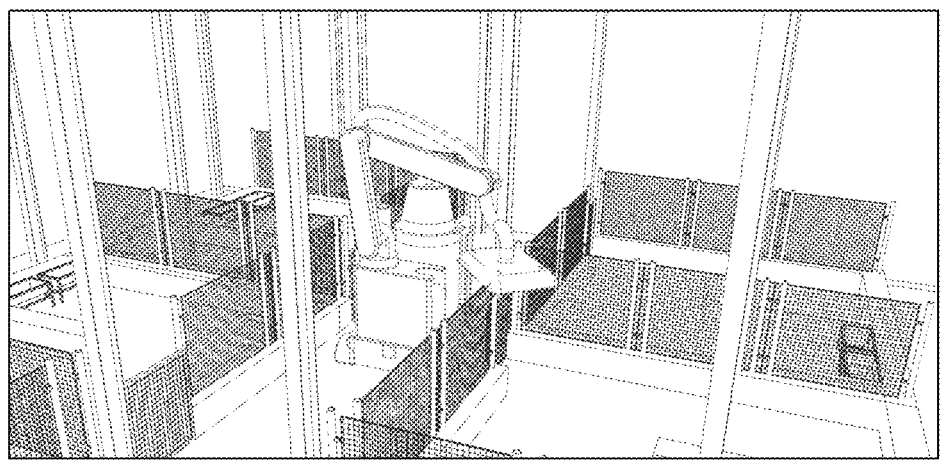
Figure 3C:
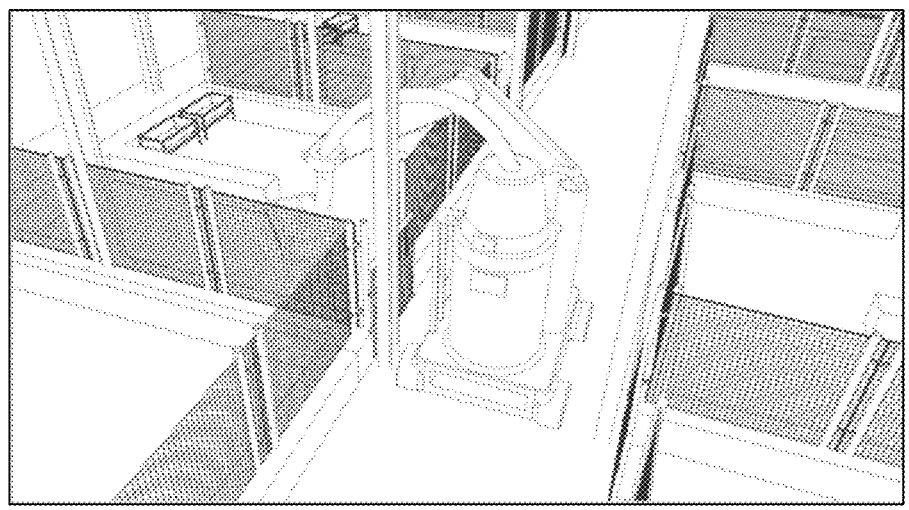

In a preferred embodiment design, when the cleaning robot works at the pigpen (FIG. 3A-3C), as the pigpen has many fences and a narrow operating space, the design of cleaning robot must be considered in detail. The overall machine weight of autonomous moving controller (10) is about 100 kg, low chassis and low center of gravity, the moving table size is 100×100×140 cm (length×width×height). Autonomous moving controller (10) comprises a multiwheel moving table, an industrial dust collector, a mechanical arm (40), a dirt container (12) as excrement storage tank, a briquetting device (22) and a power cell. The sensing devices include a 2D radar range finder and a camera. The overall mechanism design is shown in FIG. 1.

Figure 2:
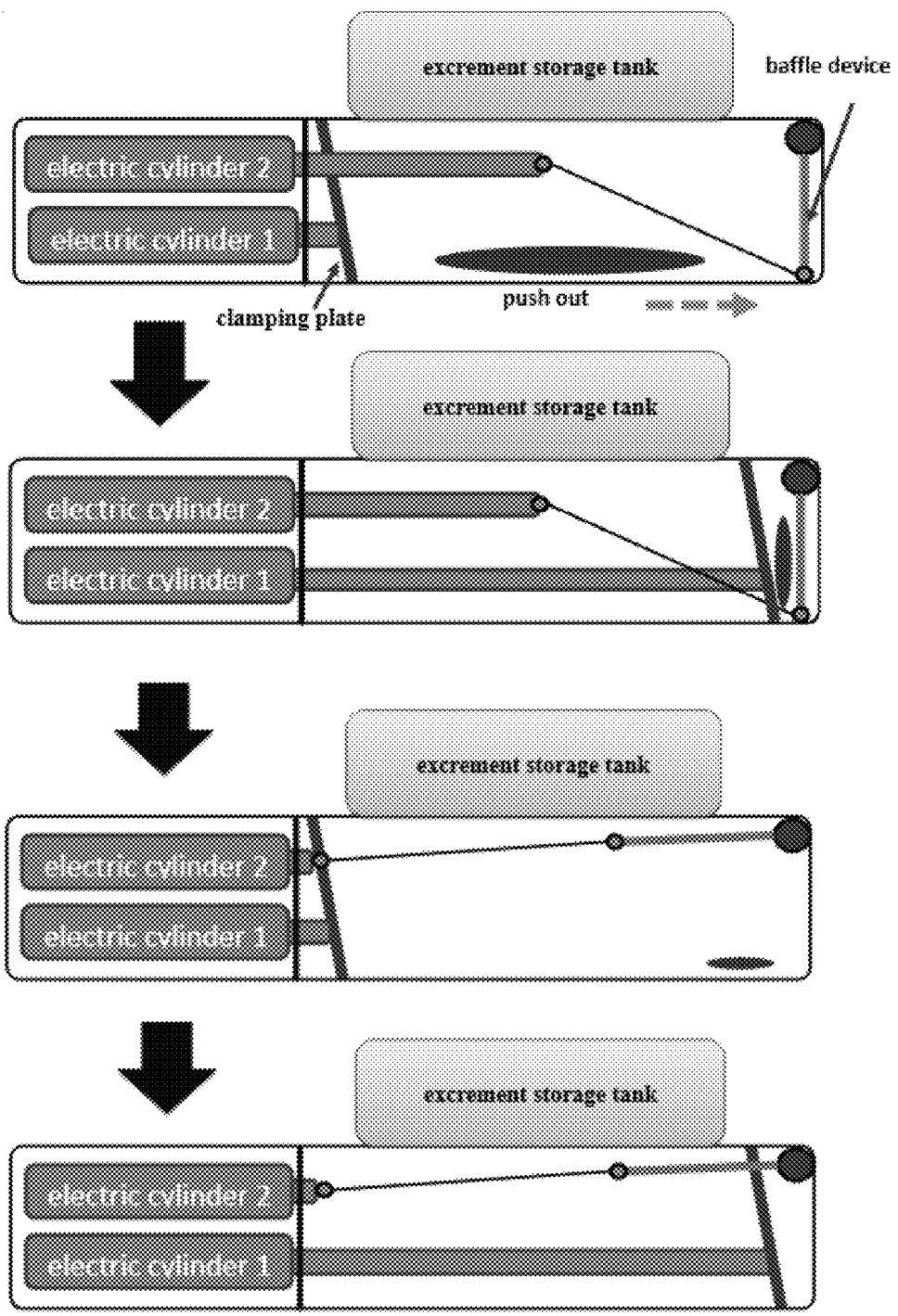
FIG. 2 is the flowchart of the excrement briquetting device of cleaning robot.

The autonomous moving controller (10) is installed on a four-wheel moving table (14), a high power DC brushless motor is used power source for four-wheel independent drive, so as to save energy and shorten the operating time. The major function of mechanical arm (40) is to drive the self-propelled cleaning head (20) to move up and down in the fence, the camera (41) installed in the front of mechanical arm (40) is used for locating the self-propelled cleaning head (20) and identifying pigs. The suction driving device installed on the compression device (22) collects excrement into the holding tank, and then the excrement compressing apparatus compresses the excrement into blocks. The compressing apparatus driving method is shown in FIG. 2.

Wherein the compression device (22) collects excrement through the upper suction driving device into the storage tank, and then the excrement compressing apparatus compresses the excrement into blocks. It comprises an electric cylinder 1, an electric cylinder 2, a compression push plate, a link mechanism and a baffle device. First, the electric cylinder 2 and link mechanism drive the baffle to close the gate, the electric cylinder 1 drives the clamping plate to extrude the excrement forward, after compression, the electric cylinder 2 drives the baffle to open the gate. Finally, the electric cylinder 1 drives the clamping plate to push out the molded objects.

The weight of self-propelled cleaning head (20) is about 50 kg, the overall height is about 10 cm, the upper surface is cambered, the base plate of self-propelled cleaning head (20) is driven by tracks for uneven landforms, the front and rear sides are equipped with cleaning brushes and wiper blades. On the other hand, the traction hose (30) is designed as a telescopic hose with a tightwire inside connected to the takeup of traction arm. The self-propelled cleaning head (20) can move up to 4 m. The traction hose (30) contains power cord, signal line, vacuum suction pipe and water pipe, the master supplies power and issues control command.

All the features disclosed in the invention shall be implemented in any combinational forms. Each feature disclosed in the present invention shall be replaced by substitutes for the same, equal or similar purposes. Therefore, unless otherwise specified, each feature is merely an embodiment of a category of equipollent or similar features.

The invention claimed is:
1. An autonomous cleaning robot device, comprising:
an autonomous moving controller, containing:
   a vacuum source;
   a dirt container connected to the vacuum source; and
   a controller processor;
a self-propelled cleaning head, connected to the controller processor, and the self-propelled cleaning head includes a suction inlet connected with a dirt receiver fluid;
a traction hose, comprising a traction mechanism, a power supply is provided for a slave machine, a vacuum suction hose and a communication cable, and combined with a mechanical arm, it can lift the slave machine over a fence for descent;
a mechanical arm, connected to the autonomous moving controller and the traction hose; and
a power source, supply electric power of the autonomous moving controller and the self-propelled cleaning head;
wherein the traction hose connect the self-propelled cleaning head to the controller processor of autonomous controller, and connecting a suction inlet airflow route from the suction inlet to the dirt container is provided.

2. The device defined in claim 1, wherein the mechanical arm has two operation modes, further comprising a single self-propelled cleaning head moves autonomously or the self-propelled cleaning head and the mechanical arm work cooperatively.

3. The device defined in claim 1, wherein the mechanical arm has a plurality of connecting rods.

4. The device defined in claim 1, wherein the mechanical arm can raise the self-propelled cleaning head according to the instruction of the controller processor to place it across region, it is unnecessary to open or close a door to enter or leave different regions.

5. The device defined in claim 1, wherein the mechanical arm comprises a sensing device at an end of the mechanical arm, wherein the sensing devices is a radar range finder or a camera.

6. The device defined in claim 1, wherein the self-propelled cleaning head moves on tracks.

7. The device defined in claim 1, wherein the self-propelled cleaning head has a compression device.

8. The device defined in claim 1, wherein the self-propelled cleaning head has a positioning label.

9. The device defined in claim 1, wherein the traction hose provides an image recognition label point.

10. The device defined in claim 1, wherein a camera at an end of the mechanical arm fetch the image recognition label point of traction hose and the positioning label of self-pushed cleaning head to recognize image, and the master as origin is combined with mechanical arm kinematics to calculate a spatially relative positions of the self-propelled cleaning head and the autonomous moving controller.

* * * * *